United States Patent
Sakai

(10) Patent No.: US 10,466,942 B2
(45) Date of Patent: Nov. 5, 2019

(54) INFORMATION PROCESSING SYSTEM, METHOD FOR CONTROLLING INFORMATION PROCESSING SYSTEM, AND STORAGE MEDIUM

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/878,198

(22) Filed: Jan. 23, 2018

(65) Prior Publication Data

US 2018/0217786 A1    Aug. 2, 2018

(30) Foreign Application Priority Data

Jan. 27, 2017   (JP) ................. 2017-013241

(51) Int. Cl.
| G06F 15/00 | (2006.01) |
| G06F 3/12  | (2006.01) |
| G06F 8/65  | (2018.01) |
| H04L 29/08 | (2006.01) |
| H04L 29/06 | (2006.01) |
| G06F 9/54  | (2006.01) |

(52) U.S. Cl.
CPC ............ *G06F 3/123* (2013.01); *G06F 3/1204* (2013.01); *G06F 3/1205* (2013.01); *G06F 3/1287* (2013.01); *G06F 3/1288* (2013.01); *G06F 8/65* (2013.01); *G06F 9/542* (2013.01); *H04L 63/083* (2013.01); *H04L 67/34* (2013.01)

(58) Field of Classification Search
CPC ...... G06F 3/123; G06F 3/1288; G06F 3/1205; G06F 8/65
USPC ........................................... 358/1.15
See application file for complete search history.

(56) References Cited

U.S. PATENT DOCUMENTS

| 9,112,891 B2     | 8/2015  | Pathak    |              |
| 2005/0021843 A1  | 1/2005  | Duigenan  |              |
| 2011/0289496 A1  | 11/2011 | Steer     |              |
| 2014/0146359 A1* | 5/2014  | Kurohata  | H04N 1/00204 |
|                  |         |           | 358/1.15     |

FOREIGN PATENT DOCUMENTS

| EP | 1575244 A2    | 9/2005 |
| JP | 2005259114 A  | 9/2005 |

* cited by examiner

*Primary Examiner* — Saeid Ebrahimi Dehkordy
(74) *Attorney, Agent, or Firm* — Canon U.S.A., Inc. IP Division

(57) ABSTRACT

An information processing system transmits a received message to a child tenant disposed immediately below a specific tenant based on a message attribute of the child tenant that is set by a setting unit.

10 Claims, 12 Drawing Sheets

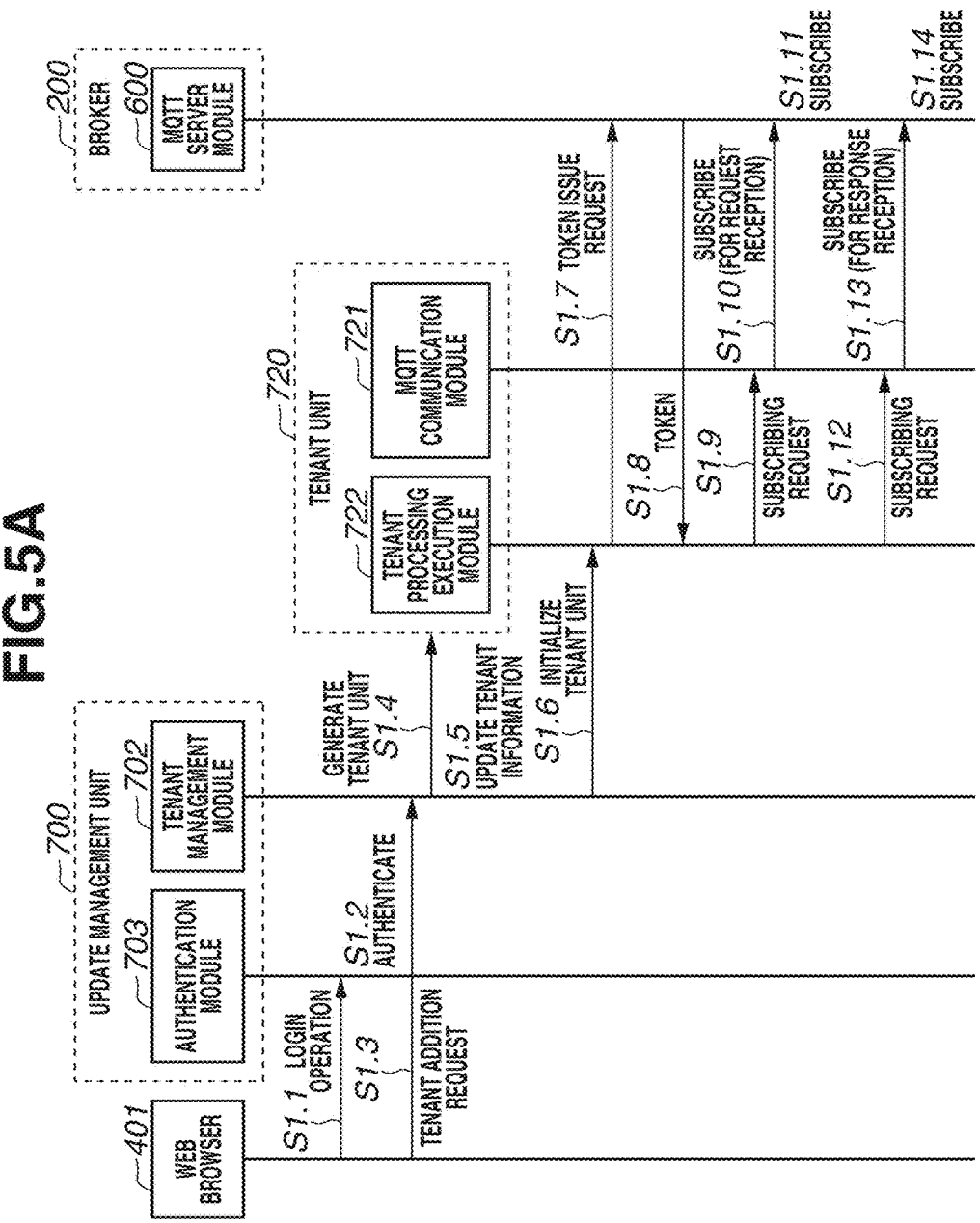

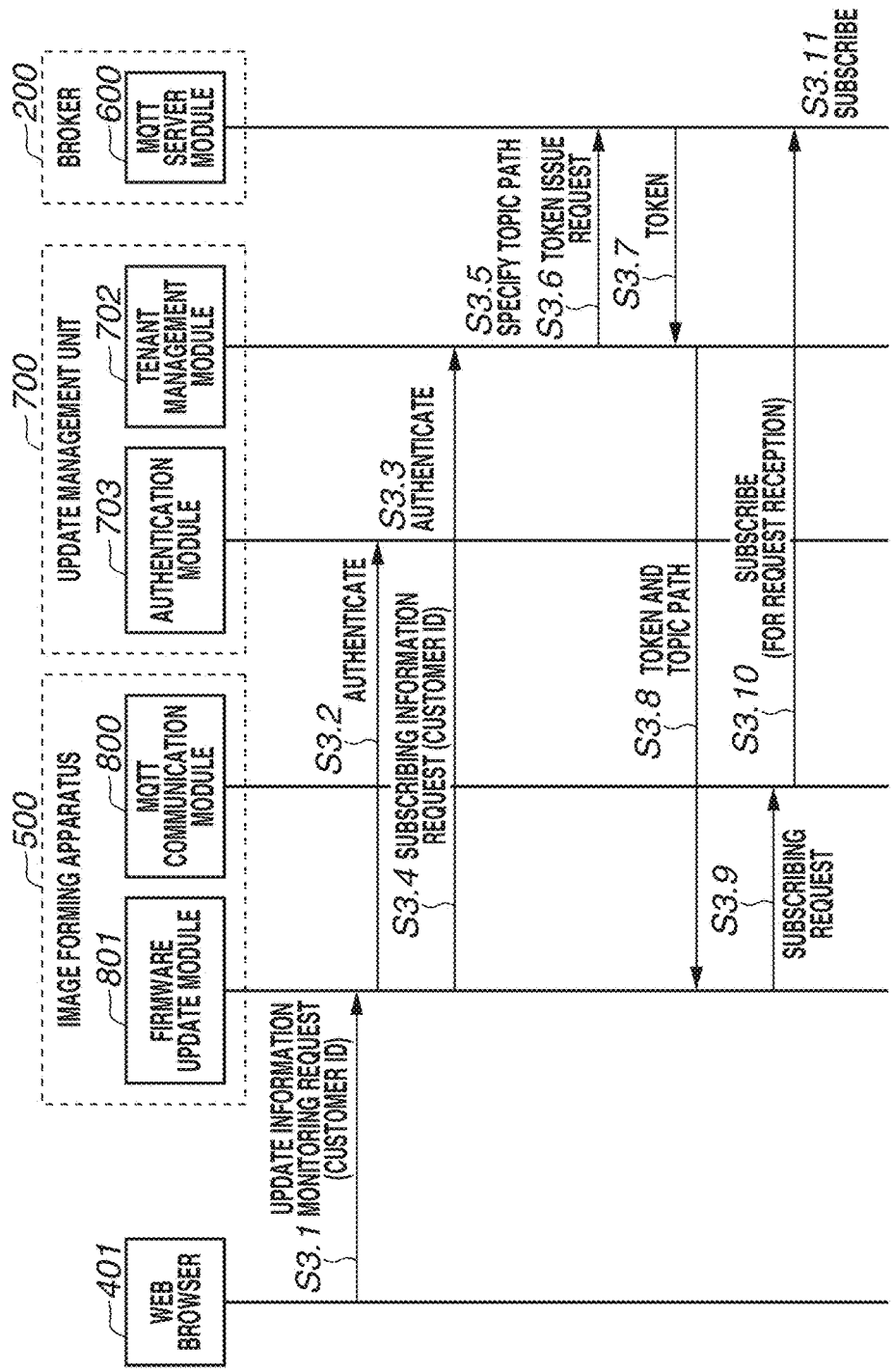

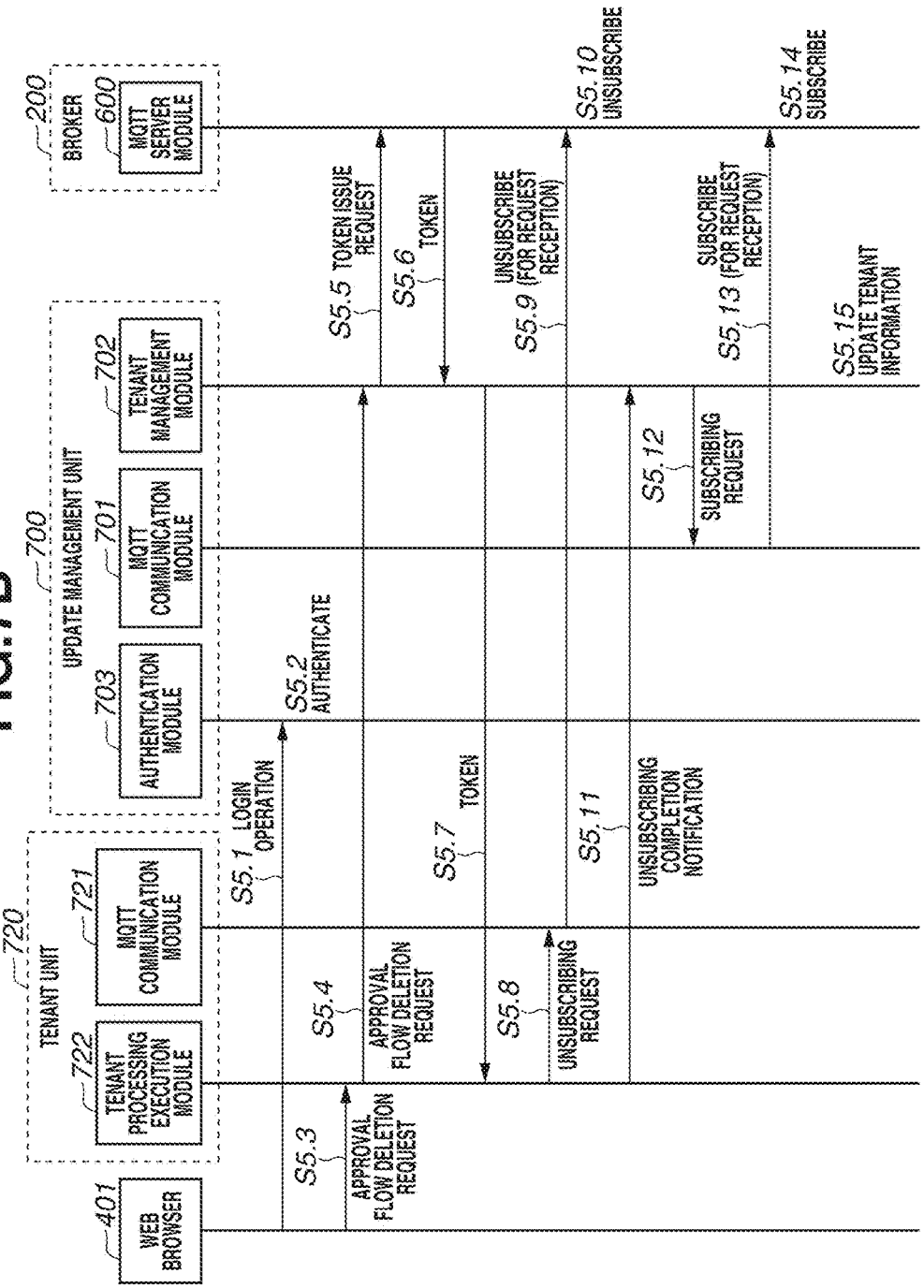

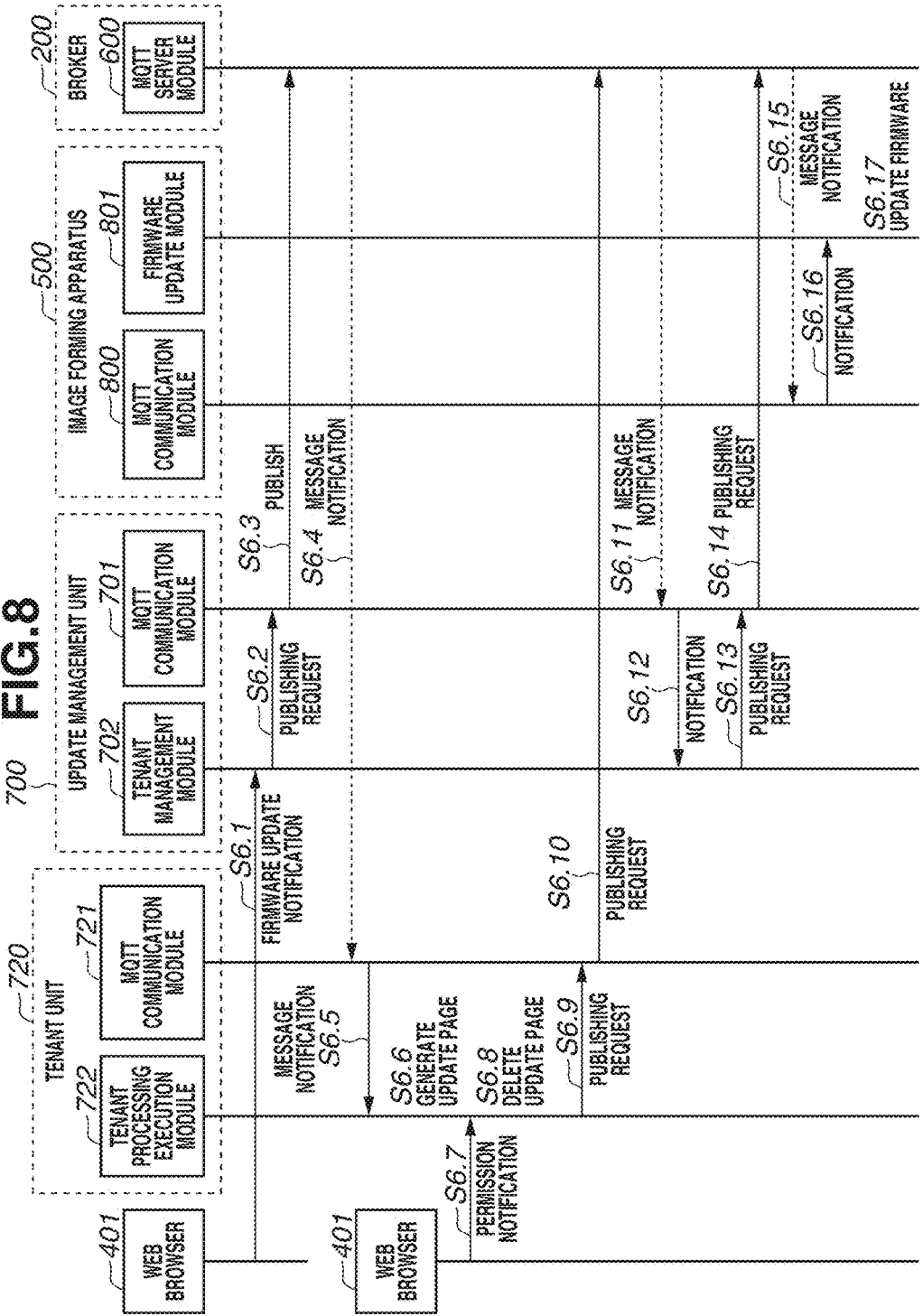

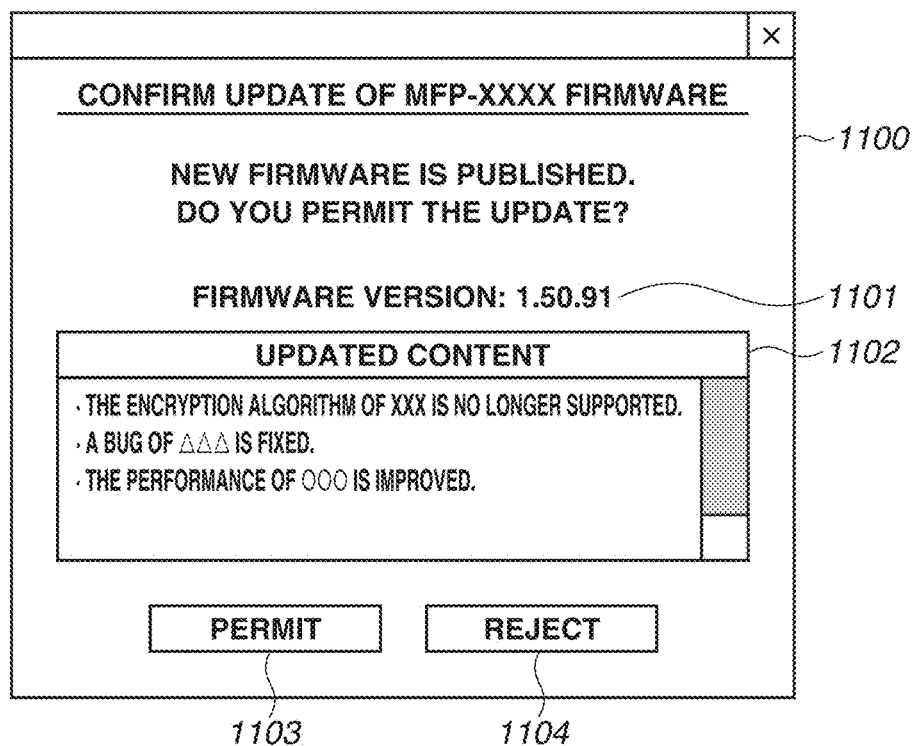

INFORMATION PROCESSING SYSTEM, METHOD FOR CONTROLLING INFORMATION PROCESSING SYSTEM, AND STORAGE MEDIUM

BACKGROUND OF THE INVENTION

Field of the Invention

The present invention relates to an information processing system that relays data which is transmitted/received between two apparatuses connected to a network, a method for controlling the information processing system, and a storage medium.

Description of the Related Art

There is known a technique for hierarchizing an update server for managing distribution of an updated software to a computer in a company by Japanese Patent Application Laid-Open No. 2005-259114. The technique discussed in Japanese Patent Application Laid-Open No. 2005-259114 is configured in such a manner that a root distribution server and at least one child distribution server are provided, and each root distribution server can function as a parent server for the child distribution server. Therefore, this technique allows software distribution at each hierarchical layer to be controlled by determining a distribution policy by the distribution server at each hierarchical layer.

SUMMARY OF THE INVENTION

According to an aspect of the present invention, an information processing system includes a generation unit configured to generate a message attribute reflecting a hierarchical relationship between a tenant and another tenant according to generation of the tenant in compliance with an instruction to generate the tenant, a setting unit configured to set the generated message attribute, a reception unit configured to receive a message from a specific tenant, and a transmission unit configured to transmit the received message to a child tenant disposed immediately below the specific tenant based on a message attribute of the child tenant that is set by the setting unit.

Further features of the present invention will become apparent from the following description of exemplary embodiments with reference to the attached drawings.

BRIEF DESCRIPTION OF THE DRAWINGS

FIGS. 5A and 5B illustrate sequences indicating processing procedures executed when a tenant unit is added.

FIG. 6 illustrates a sequence indicating a processing procedure executed when an image forming apparatus is added.

FIGS. 7A and 7B illustrate sequences indicating processing procedures when necessity or unnecessity of an approval process is changed.

FIG. 8 illustrates a sequence when the image forming apparatus is notified of a new version employment request.

FIGS. 10A and 10B illustrate examples of operation screens regarding the firmware update.

DESCRIPTION OF THE EMBODIMENTS

In a case where there is a plurality of administrators who want to determine whether data to be distributed can be distributed, the technique discussed in Japanese Patent Application Laid-Open No. 2005-259114 leads to construction of the update server by each of the administrators, thereby raising a possibility of increasing cost and/or a possibility of making construction of a distribution system difficult. The present invention is directed to facilitating a message processing process on an apparatus at an intermediate layer in a system in which an instruction is issued in a top-down manner.

In the following description, a first exemplary embodiment will be described. In the first exemplary embodiment, a solution according to the present invention will be described based on a multifunction peripheral (MFP) having a printing function by way of example. In recent years, devices targeted for enterprises including MFPs have been handled in such a manner that firmware thereof has been continuously updated due to a correction of a bug, addition of a function, and the like even after having been once brought to the market. For such a device targeted for enterprises, a person in charge of support in a sales company or a dealer, and a person responsible for device management such as a device administrator in a company often intermediate in the middle of a relationship between a device manufacturer (a provider of the firmware) and a user. Therefore, when updating the firmware of the device, it is desirable to update the firmware after each of the responsible people existing therebetween grants an approval and not to follow a determination made by only the device user individual.

For example, supposing that an updated version of security-related firmware is released from the device manufacturer, the following situation may occur in this case. The sales company does not want the update to be used until a support system is in place, and therefore does not want to release the updated version to customers so soon. Further, the administrator in the customer company does not want the firmware to be updated until he/she can confirm that no problem will arise in cooperation with an internal system of the company. This leads to actual employment of the firmware released from the device manufacturer for the device after the sales company and the customer company approve it. However, the construction of the distribution system may be difficult as described above, and therefore realization of an approval process takes a great deal of time and labor.

Figure 1:
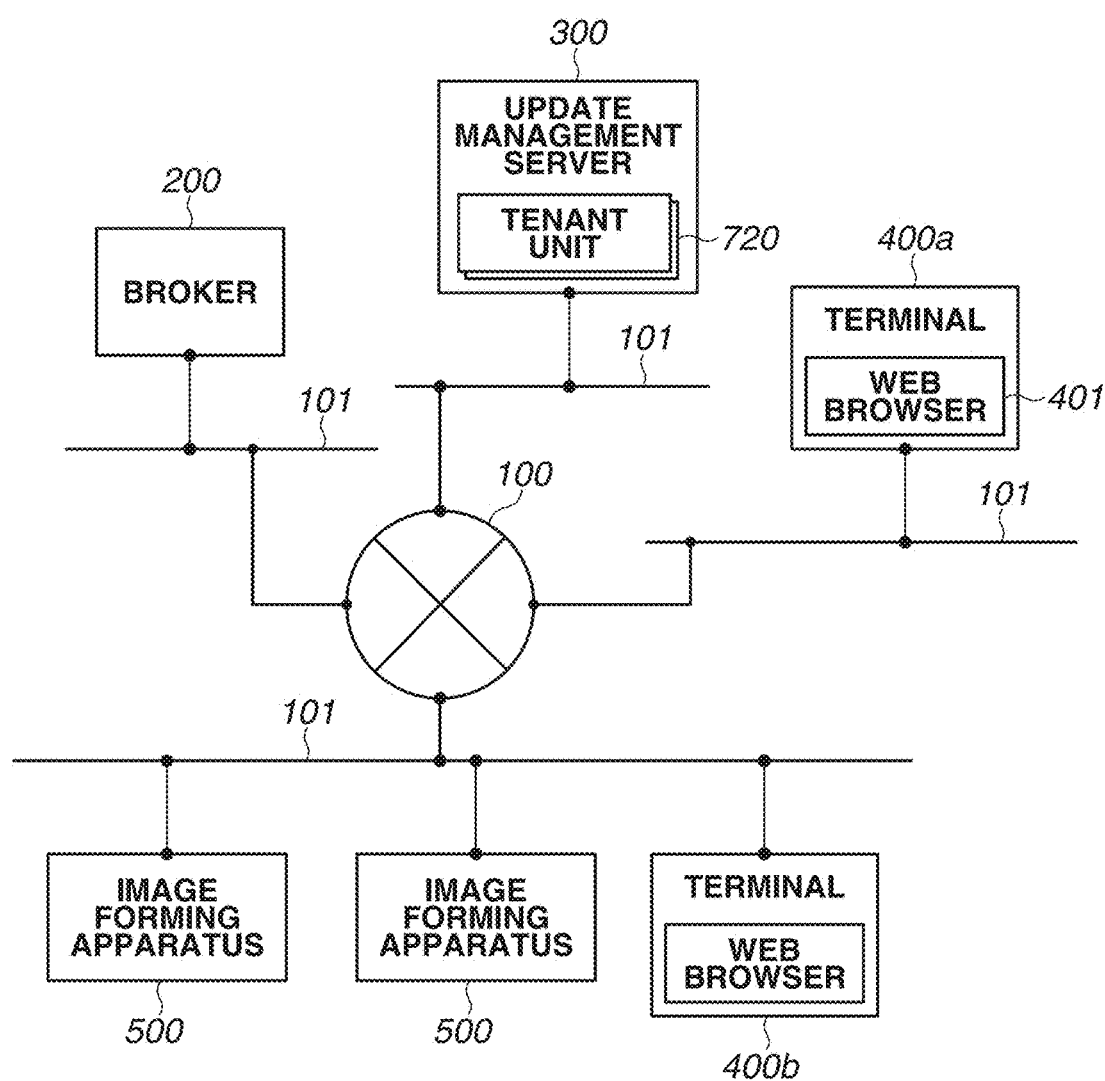
FIG. 1 illustrates a system configuration.

Next, an exemplary embodiment suitable to solve the above-described problem will be described with reference to the drawings. A firmware update system for an image forming apparatus according to the present exemplary embodiment is realized in a network configured as illustrated in FIG. 1. The network includes a wide area network 100 (WAN 100). The network further includes a local area network 101 (LAN 101) connecting individual components to one another.

A broker 200 is a server for carrying out data communication using a communication protocol called Message Queue Telemetry Transport (MQTT). MQTT (MQ Telemetry Transport or Message Queuing Telemetry Transport) is an ISO (International Organization for Standardization)

standard (ISO/IEC PRF 20922) publish-subscribe-based messaging protocol. It works on top of the TCP/IP protocol. The publish/subscribe model is a model that distributes the message from a message transmitter (hereinafter referred to as a publisher) to a message receiver (hereinafter referred to as a subscriber) via a message mediator (the broker 200). The subscriber sets a message attribute (hereinafter referred to as a topic) that the subscriber wants to receive to the broker 200 in advance (hereinafter referred to as subscribe). After the topic is set by the broker, the subscriber needs to continue maintaining a network session established with the broker 200 via the Internet. The subscriber does not necessarily have to constantly continue maintaining the network session, but needs to highly frequently connect to the broker 200 via the network if he wants to process the message in real time. When the publisher specifies the topic and transmits the message to the broker 200, the broker 200 distributes the message to the subscriber subscribing to this topic.

The topic can be expressed in the form of a hierarchical structure with use of a separating character ("/"). Further, adding a special character (a wildcard) to the topic at the time of the subscription allows the subscriber to subscribe to a plurality of topics at a time. For example, subscribing to a topic "/foo/#" in advance allows the subscriber to receive messages published to topics such as "/foo/bar" and "foo/bar/baz". Further, when wanting to stop receiving the message regarding the topic that the subscriber subscribes to, the subscriber can also cancel the subscription (hereinafter referred to as unsubscribe). The subscriber needs to disconnect the network session established with the broker 200 via the Internet to cancel the subscription. The subscriber can no longer receive the message published to the topic after disconnecting the network session. If there is no subscriber subscribing to the topic, the broker 200 can even delete the topic and cancel the setting.

The broker 200 also has a function of keeping or holding the message published last for each topic, and, when a new subscriber is added, transmitting the message published last to the added subscriber (hereinafter referred to as retain). This function allows the subscriber to acquire the latest information as of the start of the subscription. In the first exemplary embodiment, the firmware update system is constructed assuming that the communication is carried out based on MQTT, but may employ any data communication protocol that uses a mediator apparatus like the broker 200, and realizes data transmission/reception between apparatuses at two points, i.e., an apparatus that transmits data and an apparatus that receives the data ultimately.

An update management server 300 is a server for controlling a message regarding a firmware update. The update management server 300 includes a tenant unit 720 for each tenant, such as a sales company/dealer that sells and supports an image forming apparatus 500, and a customer company that introduces the image forming apparatus 500. The tenant unit 720 is a function of processing the message regarding the firmware update in response to an approval instruction from an administrator in each sales company and customer company, and is a function dynamically realized in the update management server 300 in response to an instruction from a terminal 400 or the like. Regarding a sales company and a customer company for which an approval process is unnecessary, the message is not processed by the corresponding tenant unit 720 and is instead processed by another software function in the update management server 300. In the first exemplary embodiment, the firmware update system is configured in such a manner that the tenant unit 720 is disposed in the update management server 300 and handles the approval process from the sales company or the customer company, but may be configured in such a manner that a different server is set up and undertakes the processing supposed to be performed by the tenant unit 720. If this different server is an existing server, this configuration leads to resolution of the problem in terms of the cost of the server construction, and also facilitates the approval process by using the broker 200.

Information terminals 400a and 400b are terminals represented by a personal computer (PC) or a smartphone, and each include a web browser 401 built therein. A person in charge of the firmware update in the device manufacturer, the sales company, or the like issues an instruction to the update management server 300 by using the web browser 401. The information terminal 400a is an example of a connection of a terminal used by the person in charge in the device manufacturer or the sales company, and the information terminal 400b is an example of a connection of a terminal used by a person in charge in the customer company using the image forming apparatus 500. This example is merely one example, and the information terminals 400a and 400b may be located anywhere as long as they are connected in a state communicable via the network. Therefore, in the following description, the information terminals 400a and 400b will be described as a terminal 400 without being distinguished from each other. Further, in the first exemplary embodiment, the firmware update system is configured in such a manner that the instruction is issued to the update management server 300 via the web browser 401, but may be configured to use a dedicated application.

The image forming apparatus 500 is, for example, the MFP. The image forming apparatus 500 has a function of automatically updating the firmware based on received information upon receiving an instruction to update the firmware from the broker 200.

The broker 200 and the update management server 300 are illustrated as being each constructed with use of one information processing apparatus in FIG. 1, but it is also possible that the firmware update system is configured in such a manner that the broker 200 and the update management server 300 are each constructed with use of a plurality of information processing apparatuses. When a term "information processing system" is used in the present disclosure, this term shall refer to a system constructed with use of one information processing apparatus or a plurality of information processing apparatuses.

Figure 2A:
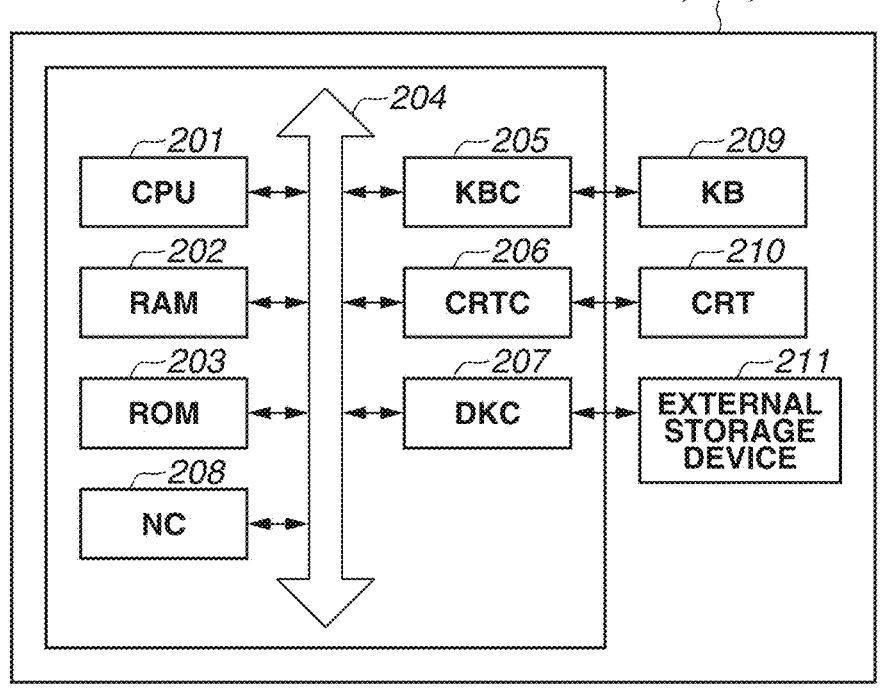
FIGS. 2A and 2B are block diagrams illustrating hardware configurations of system components.
Figure 2B:
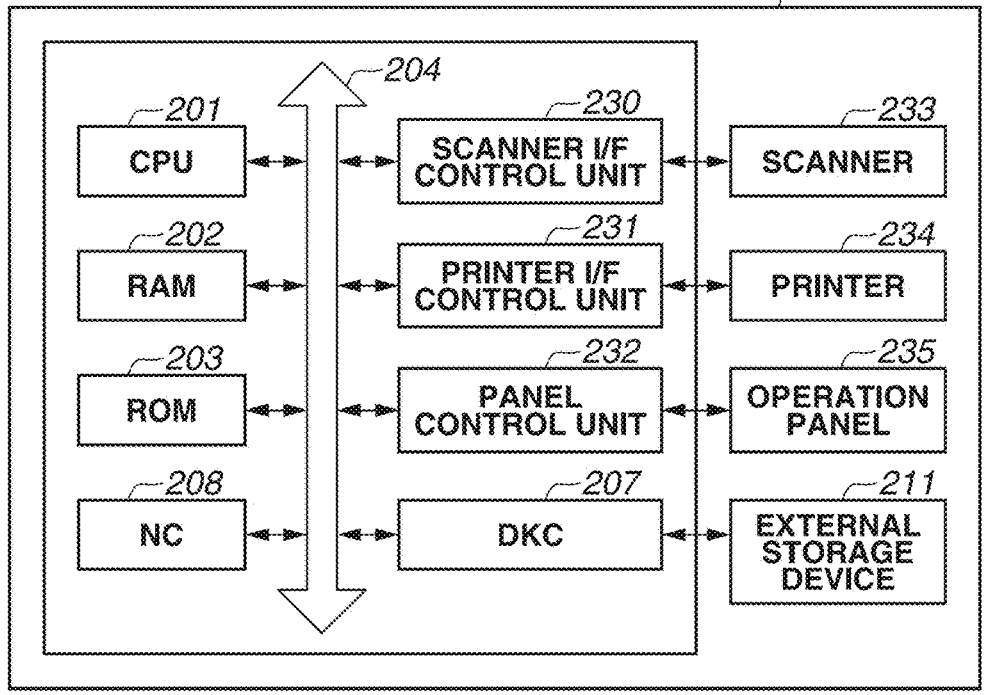

FIGS. 2A and 2B illustrate one example of hardware configurations of the broker 200, the update management server 300, the terminal 400, and the image forming apparatus 500. Assume that a hardware block diagram illustrated in FIG. 2A corresponds to a hardware block diagram of a commonly-used information processing apparatus such as a PC, and the hardware configuration of the commonly-used information processing apparatus can be applied to each of the servers and terminals according to the present exemplary embodiment.

In the following description, the hardware configuration illustrated in FIG. 2A will be described assuming that this configuration indicates the hardware configuration of the broker 200 by way of example. A central processing unit (CPU) 201 executes a program such as an operating system (OS) and an application loaded from an external storage device 211 such as a read only memory (ROM) 203 or a hard disk (HD) into a random access memory (RAM) 202, thereby controlling each of blocks connected to a system bus 204. The OS in the present disclosure is an abbreviation for an operating system running on a computer, and the operating system will be referred to as the OS hereinafter. The RAM 202 functions as a main memory, a work area, and the like of the CPU 201.

A keyboard controller (KBC) 205 controls a key input from a keyboard 209 or a not-illustrated pointing device. A cathode-ray tube (CRT) controller (CRTC) 206 controls a display on a CRT display 210. A disk controller (DKC) 207 controls access to data in the external storage device 211 such as the HD storing various kinds of data therein. A network controller (NC) 208 performs processing for controlling communication with another apparatus connected via the WAN 100, the LAN 101, or a public line. In the description that will be provided below, assume that the CPU 201 is hardware that actually engages in execution in the broker 200, unless otherwise especially indicated. Then, a software configuration of the broker 200 and processing by the broker 200 illustrated in sequence diagrams that will be described below are realized by execution of the application program stored in the external storage device 211 or the like by the CPU 201.

The hardware configurations of the update management server 300 and the terminal 400 are also configured as illustrated in the above-described drawing, FIG. 2A. In other words, respective software configurations and respective processing procedures illustrated in the sequence diagrams that will be described below are realized by execution of the application programs stored in the respective external storage devices 211 or the like by the respective CPUs 201.

FIG. 2B illustrates the hardware configuration of the image forming apparatus 500. This configuration is approximately similar to the configuration illustrated in the above-described drawing, FIG. 2A, and therefore will be described focusing only on differences from the configuration illustrated in FIG. 2A. The image forming apparatus 500 does not include the keyboard controller (KBC) 205 and the CRT controller (CRTC) 206, and includes a scanner interface (I/F) control unit 230, a printer I/F control unit 231, and a panel control unit 232. The scanner I/F control unit 230 controls a scanner 233 for inputting image data from an original document. The scanner 233 is a device for reading in the original document and generating the image data.

The printer I/F control unit 231 controls a printer 234 for printing the image data. The printer 234 is a device for outputting the image data onto paper. The panel control unit 232 controls an operation panel 235, and displays various kinds of information and receives an instruction input from a user. The operation panel 235 includes a display, a touch panel, and a hardware key, and is a device for displaying various kinds of setting screens and receiving the instruction from the user. The CPU 201 also serves as hardware that actually engages in execution in the image forming apparatus 500. A software configuration of the image forming apparatus 500 and processing by the image forming apparatus 500 illustrated in the sequence diagrams that will be described below are realized by execution of the firmware, the application program, and the like stored in the external storage device 211 by the CPU 201.

Figure 3:
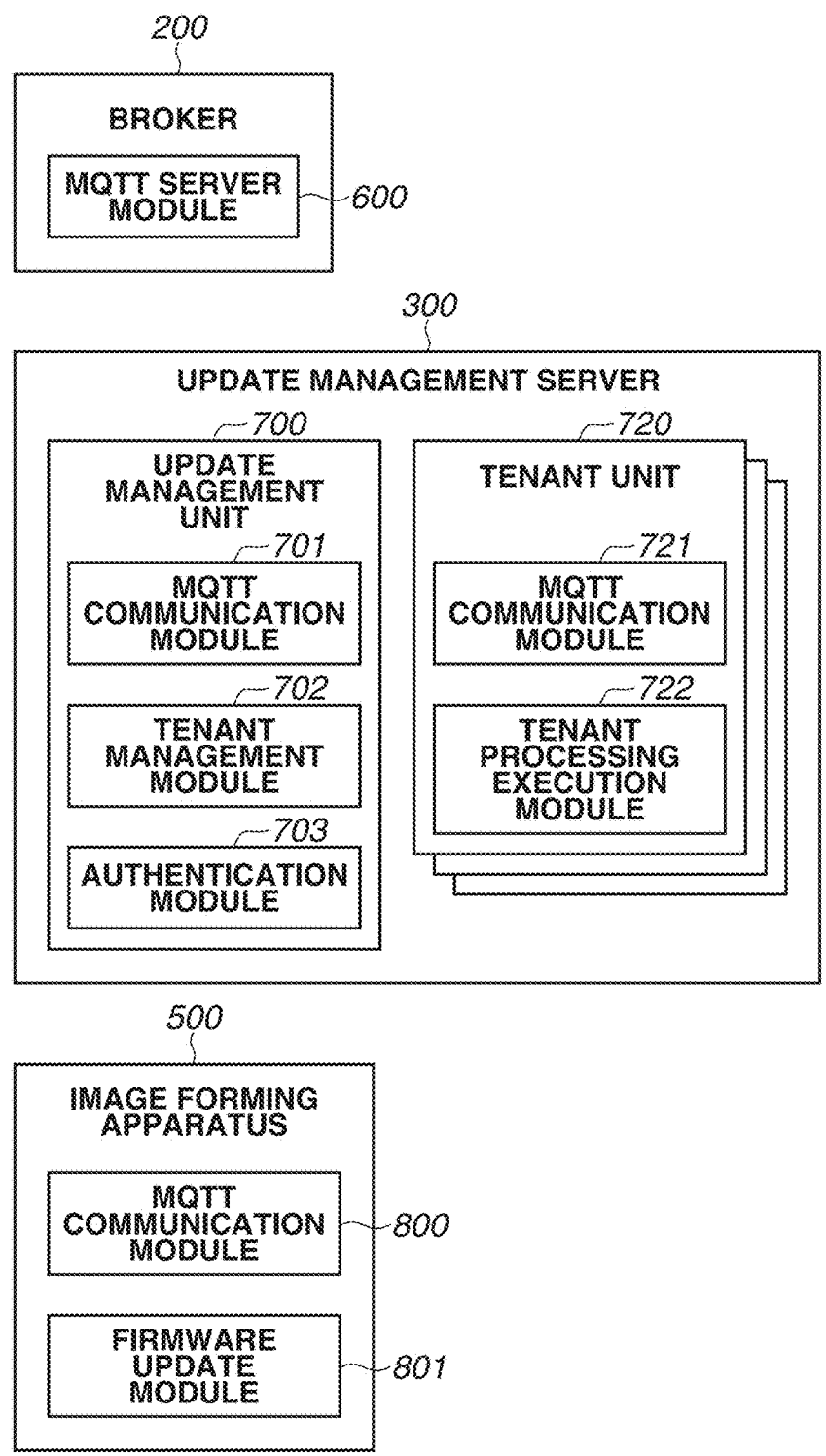
FIG. 3 illustrates software modules.

FIG. 3 illustrates the respective software configurations of the broker 200, the update management server 300, and the image forming apparatus 500 according to the first exemplary embodiment. Each of them provides a service and a function by executing various kinds of modules included in these software configurations. The various kinds of modules included in the software configuration held by each of the components in the firmware update system according to the present exemplary embodiment are realized by execution of the software program loaded into the RAM 202 by the CPU 201 of each of the apparatuses.

The broker 200 includes an MQTT server module 600. The MQTT server module 600 is a module that receives the message published from the publisher and distributes the received message to the subscriber. In the first exemplary embodiment, each of an update management unit 700, the tenant unit 720, and the image forming apparatus 500 functions as the publisher and the subscriber. Further, in the first exemplary embodiment, the MQTT server module 600 also issues a token required to subscribe to and publish the message according to a request from the update management server 300. The token issued here is a token for verifying whether the user is authorized. Verifying the token when the message is subscribed to or published can prevent the message from being subscribed to or published in an unauthorized manner by a third party.

The update management server 300 includes the update management unit 700 and the tenant unit 720. The update management unit 700 plays a role of performing control so as to receive a notification of the firmware update transmitted by the person in charge in the device manufacturer from the terminal 400, and transmit a notification to each of the tenant units 720 or the image forming apparatus 500 via the broker 200. The update management unit 700 includes an MQTT communication module 701, a tenant management module 702, and an authentication module 703. The MQTT communication module 701 transmits the message to another tenant or the image forming apparatus 500 by publishing the message to the broker 200. Further, the MQTT communication module 701 also receives the message from another tenant or the image forming apparatus 500 by subscribing to the broker 200.

The tenant management module 702, according to addition or deletion of the sales company and the customer company, generates or deletes the tenant unit 720 corresponding to each of them. Further, the tenant management module 702 also manages information about whether an approval at the time of the firmware update is necessary at each of the tenants. Further, the tenant management module 702 has a function of receiving the notification of the firmware update that is transmitted by the administrator from the terminal 400 and publishing the message to the broker 200 via the MQTT communication module 701 to notify the tenant unit 720 of the message of the update. Further, the tenant management module 702 also has a function of substituting for each of the tenant units 720 to perform the message processing in place thereof if the approval by each of the tenant units 720 is unnecessary. Whether the approval is necessary or unnecessary can be dynamically switched. The authentication module 703 has a function of authenticating a user who is a request source of processing. In the first exemplary embodiment, the authentication module 703 is assumed to authenticate the user by receiving a user identification (ID) and a password, but is not limited thereto and can authenticate the user with use of various kinds of authentication information such as biological information.

The tenant unit 720 is provided to perform the message processing in response to the approval instruction from the sales company or the customer company, and includes an MQTT communication module 721 and a tenant processing execution module 722. The MQTT communication module 721 transmits the message to another tenant or the image forming apparatus 500 by publishing the message to the broker 200. Further, the MQTT communication module 721 receives the message from another tenant or the image forming apparatus 500 by subscribing to the broker 200. Further, the tenant processing execution module 722 provides a screen for approving the firmware update to the person in charge in the sales company or the customer company, and also performs the approval process if the approval instruction is issued on the approval screen. Further, the tenant processing execution module 722 carries out various kinds of message communication via the MQTT communication module 721 with the aid of the mediation by the broker 200.

The image forming apparatus 500 includes an MQTT communication module 800 and a firmware update module 801. The MQTT communication module 800 transmits the message to another tenant or another image forming apparatus 500 by publishing the message to the broker 200. Further, the MQTT communication module 800 receives the message from another tenant or another image forming apparatus 500 by subscribing to the broker 200. The firmware update module 801 has a function of receiving a firmware update message via the MQTT communication module 800 and updating the firmware. Further, the firmware update module 801 also has a function of transmitting an update result after updating the firmware. These components serve as software functions required to implement the present exemplary embodiment.

Figure 4:
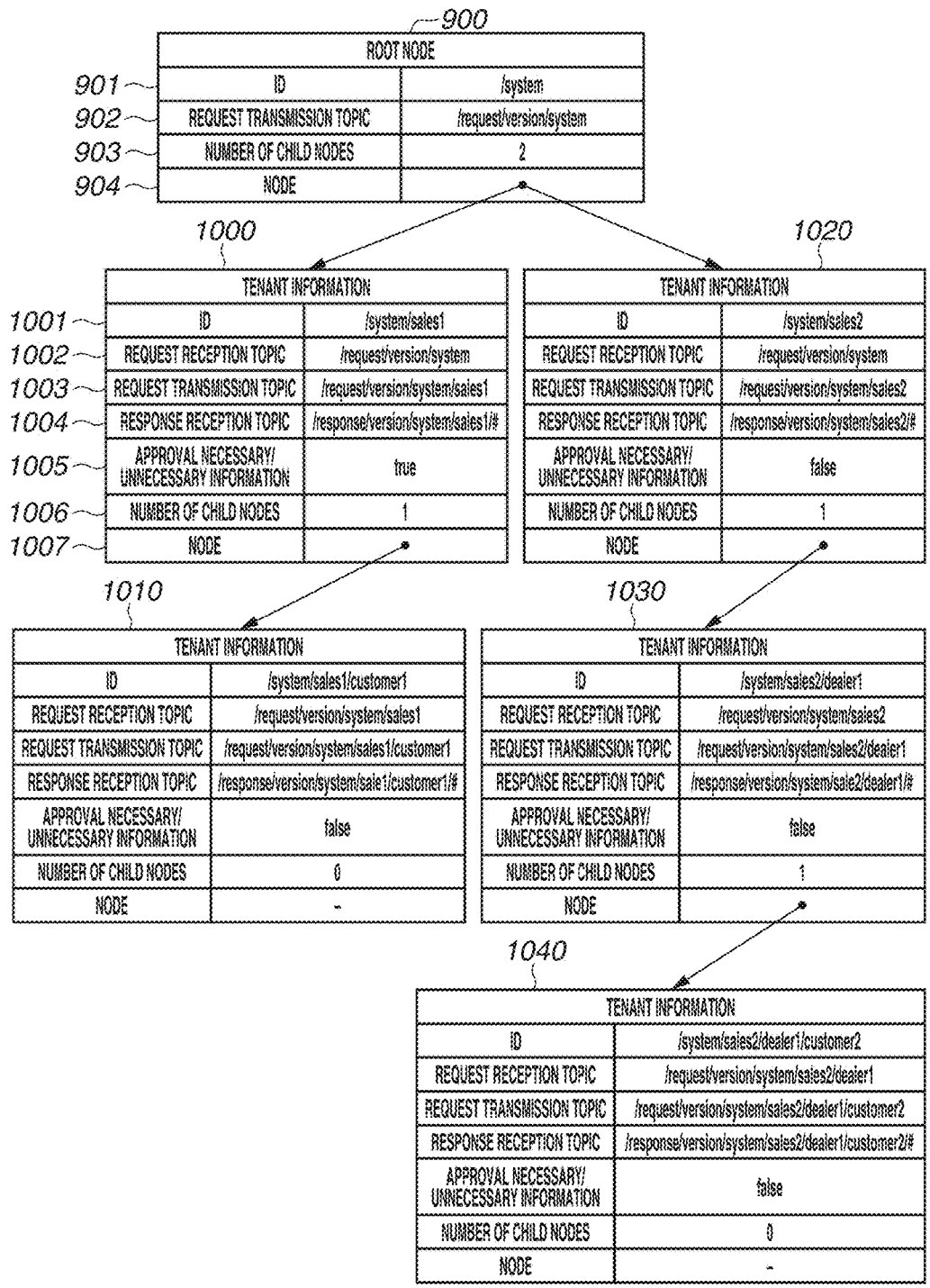
FIG. 4 illustrates an example of each piece of tenant/device information managed on an update system.

Next, information of each of the tenant units 720 (hereinafter referred to as tenant information) managed by the tenant management module 702 will be described with reference to FIG. 4. The tenant information is managed under a tree structure, and is managed under a structure reflecting an actual hierarchical relationship between the sales company and the customer company. In the first exemplary embodiment, the tenants are assumed to be in such a hierarchical relationship that there are two sales companies below the device manufacturer, one customer company below the first sales company and one dealer below the second sales company, and further a customer company below the dealer, by way of example. FIG. 4 expresses this hierarchical relationship as the tree structure. For example, the device manufacturer and the sales companies are in such a relationship that the device manufacturer is a parent tenant of the sales companies, and these sales companies are child tenants of the device manufacturer. Similarly, the second sales company corresponds to a parent tenant of the dealer, and the dealer corresponds to a child tenant of the sales company.

A root node 900 is the most primary source information for managing the tenant information, and corresponds to a hierarchical layer of the device manufacturer. The root node 900 includes information of each of an ID 901, a request transmission topic 902, a number of child nodes 903, and a node 904. The ID 901 is an identifier for identifying the node. The request transmission topic 902 indicates a topic that the update management unit 700 specifies when publishing the message upon receiving the request to update the version from the terminal 400 of the device manufacturer. The number of child nodes 903 indicates the number of tenants positioned immediately below the root node 900. Since FIG. 4 illustrates the example in which there are the two sales companies as described above, there are two tenant units 720 respectively corresponding to the sales companies below the root node 900. The node 904 holds an array of a pointer pointing to the node storing therein the tenant information of each of the tenants positioned below the root node 900.

Nodes 1000, 1010, 1020, 1030, and 1040 store the tenant information therein. An ID 1001 is an identifier for identifying the node storing the tenant information therein. A request reception topic 1002 is a topic for receiving the message to request the firmware update from the broker 200, and the tenant unit 720 subscribes to this topic. This topic is expressed as a topic path specifying a tenant located one layer above, i.e., immediately above this tenant itself. This means that the tenant information of the child tenant contains information for subscribing to the message from the tenant located immediately above this tenant itself.

A request transmission topic 1003 indicates a topic specified when a firmware update request message is published after the request to update the firmware is approved. This topic is expressed as a topic path corresponding to this tenant itself. Employing such a configuration that publishes the message to the topic path and subscribes to the topic path allows the tenant to distribute the message while intending the tenant unit 720 positioned below this tenant itself as a transmission destination by publishing the message to the path corresponding to this tenant itself. This distribution allows the tenant to transmit the message to the tenant unit 720 disposed immediately below this tenant itself.

A response reception topic 1004 is a topic for receiving the processing result of the image forming apparatus 500 that has received the request to update the firmware. This topic is prepared in such a manner that a wildcard is specified regarding a path following the topic path corresponding to this tenant itself. Therefore, this topic allows the tenant to receive processing results of all image forming apparatuses 500 located below this tenant itself.

Approval necessary/unnecessary information 1005 is information indicating whether the company corresponding to this tenant unit 720 requires the approval process with respect to the request to update the firmware. If this information is set to true, the tenant unit 720 performs control so as to receive the firmware update notification message by itself, receive the instruction to permit the firmware update from the person in charge in the company corresponding to the tenant unit 720, and transmit the firmware update notification to the lower hierarchical layer.

On the other hand, if the approval necessary/unnecessary information 1005 is set to false, this setting causes the tenant unit 720 to refrain from processing regarding the firmware update request and the update management unit 700 of the update management server 300 to perform the processing in place thereof. A number of child nodes 1006 indicates the number of tenants positioned immediately below this tenant. As described above, the present structure is constructed assuming that there are the customer company and the dealer below the two sales companies, respectively. Therefore, in the example illustrated in FIG. 4, the tree structure is structured in such a manner that there is "/system/sales1/customer1" below "/system/sales1" and "/system/sales2/dealer1" below "/system/sales2", and is prepared in such a form that the hierarchical relationship among the tenants is reflected in the topic path.

The node 1007 stores therein an array of a pointer pointing to the node storing therein the tenant information of the tenant positioned immediately below this tenant. In the first exemplary embodiment, FIG. 4 illustrates the example of the structure in which there is the customer company below the sales company, and the structure in which there are the dealer below the sales company and the customer company further below this dealer. However, the structure of the tenants is not limited to the illustrated tenants, and, further, may be structured as a further deeper hierarchical structure than the illustrated hierarchical structure.

Figure 5B:
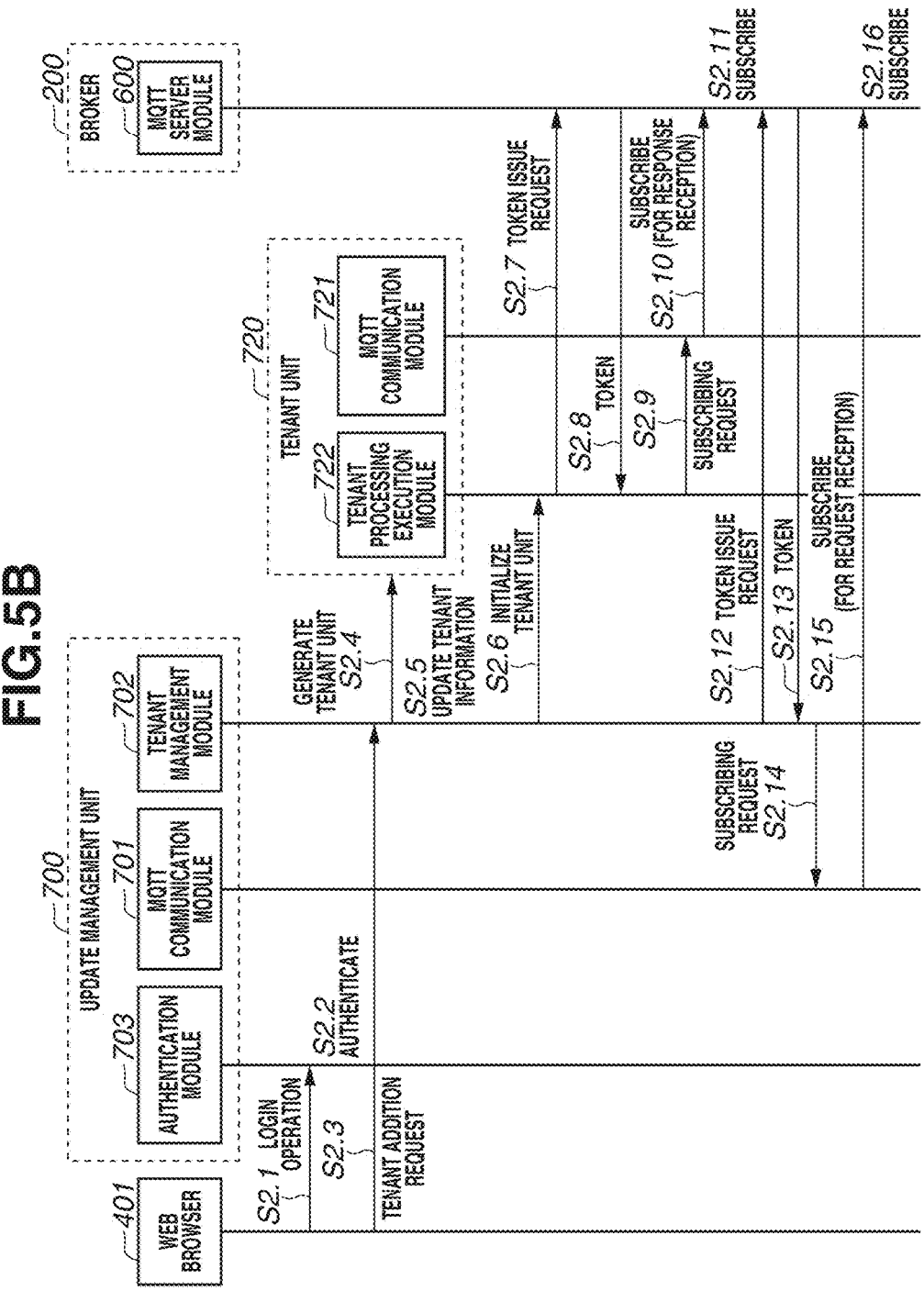

FIGS. 5A and 5B illustrate sequences when the update management server 300 adds the tenant unit 720. FIG. 5A illustrates a sequence in the case where the company corresponding to this tenant unit 720 performs the approval process, and indicates a flow when the administrator in the company located above this company issues an instruction to add the tenant unit 720 to the update management server 300 on the terminal 400. This sequence is applied, for example, when the device manufacturer adds the tenant unit 720 corresponding to the sales company or when the sales company adds the tenant unit 720 corresponding to the customer company. In the following description, this sequence will be described referring to an example in which the device manufacturer adds the tenant unit 720 corresponding to the sales company (/system/sales1).

First, when the person in charge in the device manufacturer inputs the user ID and the password in the web browser 401 on the terminal 400, in step S1.1, the web browser 401 transmits the input information to the authentication module 703. In the first exemplary embodiment, the user ID and the password are used as the information for the authentication, but the authentication module 703 may be configured to use another information such as the biological information. Upon receiving the user ID and the password from the terminal 400, in step S1.2, the authentication module 703 performs authentication processing by checking the received user ID and password information.

If in the authentication is successful, in step S1.3, the terminal 400 transmits a tenant addition request to the tenant management module 702. The tenant addition request contains the ID of the parent of the tenant, the ID of the tenant requested to be added, and the approval necessary/unnecessary information therein. Since the present example indicates the sequence assuming that the device manufacturer adds the sales company ("/system/sales1"), the terminal 400 transmits "/system" as the ID of the parent and "/system/sales1" as the ID of the tenant requested to be added. Further, since FIG. 5A illustrates the sequence in the case where the sales company performs the approval process, the terminal 400 transmits "true" as the approval necessary/unnecessary information. In step S1.4, the tenant management module 702 generates the tenant unit 720 upon receiving the instruction to generate the tenant from the terminal 400.

If generating the tenant unit 720 succeeds, in step S1.5, the tenant management module 702 updates the existing tenant information. More specifically, the tenant management module 702 generates the node 1000 holding the tenant information illustrated in FIG. 4 based on the information received in step S1.4, and adds the generated node 1000 below the parent node. Upon completing the update of the tenant information, in step S1.6, the tenant management module 702 issues an initialization request to the tenant processing execution module 722 of the tenant unit 720 generated in step S1.4. At this time, the tenant management module 702 also notifies the tenant processing execution module 722 of the tenant information generated in step S1.5 and "true" as the approval necessary/unnecessary information together with the initialization request.

Upon receiving the tenant initialization request, in step S1.7, the tenant processing execution module 722 issues a token acquisition request to the MQTT server module 600. Upon receiving the token acquisition request, the MQTT server module 600 generates a token. Then, in step S1.8, the MQTT server module 600 transmits the token to the tenant processing execution module 722.

Upon receiving the token, in step S1.9, the tenant processing execution module 722 calls a subscribing request application programming interface (API) of the MQTT communication module 721 since the received necessary/unnecessary information indicates "true". At this time, the tenant processing execution module 722 specifies the request reception topic 1002 contained in the tenant information received in step S1.6. When the subscribing request API is called, in step S1.10, the MQTT communication module 721 transmits a subscribing request to the MQTT server module 600. At this time, the MQTT communication module 721 transmits the token received in step S1.8 together therewith. Upon receiving the subscribing request and the token, in step S1.11, the MQTT server module 600 verifies the received token, and sets the request reception topic 1002 if the verification is successful.

Upon completion of the subscribing processing for request reception, next, in step S1.12, the tenant processing execution module 722 calls the subscribing request API of the MQTT communication module 721 again to receive the processing result of the image forming apparatus 500. At this time, the tenant processing execution module 722 specifies the response reception topic 1004 contained in the tenant information received in step S1.6. When the subscribing request API is called, in step S1.13, the MQTT communication module 721 transmits a subscribing request to the MQTT server module 600. At this time, the MQTT communication module 721 transmits the token received in step S1.8 together therewith. Upon receiving the subscribing request and the token, in step S1.14, the MQTT server module 600 verifies the received token, and sets the response reception topic 1004 if the verification is successful. In the first exemplary embodiment, the firmware update system is configured in such a manner that the tenant unit 720 necessarily subscribes for the response reception, but may be configured in such a manner that whether to receive the processing result is also specified in step S1.3 and the tenant unit 720 does not subscribe for the response reception. In this case, steps S1.12 to S1.14 are omitted.

FIG. 5B illustrates a sequence in the case where the approval by the tenant is unnecessary, and indicates a flow when the administrator instructs the update management server 300 to add the tenant on the terminal 400. This sequence includes many processing procedures similar to FIG. 5A, and therefore will be described detailing only differences therefrom. Steps S2.1 and S2.2 are similar to steps S1.1 and S1.2 illustrated in FIG. 5A. If the authentication is successful, in step S2.3, the terminal 400 transmits a tenant addition request to the tenant management module 702. At this time, the terminal 400 specifies "false" as the approval necessary/unnecessary information contained in the tenant addition request. Processing from steps S2.4 to S2.8 is similar to steps S1.4 to S1.8 illustrated in FIG. 5A except for "false" specified as the approval necessary/unnecessary information.

In step S2.8, the tenant processing execution module 722 receives the token, but does not subscribe for the request reception since the received approval necessary/unnecessary information indicates "false". Then, in step S2.9, the tenant processing execution module 722 calls the subscribing request API of the MQTT communication module 721. At this time, the tenant processing execution module 722 specifies the response reception topic 1004 contained in the tenant information received in step S2.6. When the subscribing request API is called, in step S2.10, the MQTT communication module 721 transmits a subscribing request to the MQTT server module 600. At this time, the MQTT communication module 721 also transmits the token received in step S2.8. Upon receiving the subscribing request and the token, in step S2.11, the MQTT server module 600 verifies the received token, and sets the response reception topic 1004 if the verification is successful. In a case where the processing result is not desired to be received by the tenant unit 720, each of steps S2.7, S2.8, S2.9, S2.10, and S2.11 can be omitted.

Upon completion of the initialization of the tenant unit 720, the tenant management module 702 subscribes for the request reception in place of the tenant processing execution module 722 of the tenant unit 720 by performing the following processing, since the received approval necessary/unnecessary information indicates "false". In step S2.12, the tenant management module 702 issues a token acquisition request to the MQTT server module 600. Upon receiving the token acquisition request, in step S2.13, the MQTT server module 600 generates a token, and transmits the generated token to the tenant management module 702. Upon receiving the token, in step S2.14, the tenant management module 702 calls a subscribing request API of the MQTT communication module 701. At this time, the tenant management module 702 specifies the information of the request reception topic 1002 by referring to the tenant information generated in step S2.5. When the subscribing request API is called, in step S2.15, the MQTT communication module 701 transmits a subscribing request to the MQTT server module 600. At this time, the MQTT communication module 701 transmits the token received in step S2.13 together therewith. Upon receiving the subscribing request and the token, in step S2.16, the MQTT server module 600 verifies the received token, and sets the request reception topic 1002 if the verification is successful.

In this manner, the update management unit 700 that has generated the tenant unit 720, i.e., the apparatus corresponding to the root node 900 illustrated in FIG. 4 can also subscribe in place of the generated tenant unit 720. The apparatus corresponding to the root node 900 will be referred to as a root system, and the above-described processing allows the root system to perform the approval process in place of the tenant based on an approval by the company corresponding to the generated tenant. The approval process in this case may be arranged so as to be automatically approved.

After the subscribing processing is completed, the latest message as of that time regarding the topic subscribed to may be transmitted to the MQTT communication module 721 or 701 due to the retaining function of the MQTT server module 600. Processing performed when the latest message is transmitted to the MQTT communication module 721 after step S1.11 is similar to processing in step S6.4 and steps subsequent thereto illustrated in FIG. 8. Further, processing performed when the latest message is transmitted to the MQTT communication module 701 after step S2.16 is similar to processing in step S6.11 and steps subsequent thereto illustrated in FIG. 8. Further, processing performed when the latest message is transmitted to the MQTT communication module 721 after step S1.14 or S2.11 is similar to processing in step S7.4 and steps subsequent thereto illustrated in FIG. 9. Details of each of them will be described below.

FIG. 6 illustrates a sequence when the image forming apparatus 500 is added to targets of the firmware update system. In step S3.1, when the administrator in the customer company operates a web setting page on the image forming apparatus 500, the web browser 401 transmits a firmware automatic update request to the firmware update module 801. This firmware automatic update request contains information of a customer ID input on the web browser 401. The customer ID is an ID assigned to the customer tenant of the customer operating the image forming apparatus 500, and corresponds to the ID of the customer tenant at the lowest hierarchical layer like 1040 illustrated in FIG. 4. Specifying this ID allows the image forming apparatus 500 to subscribe to the message from the tenant at the lowest hierarchical layer. Upon receiving the firmware automatic update request, in step S3.2, the firmware update module 801 of the image forming apparatus 500 transmits authentication information to the authentication module 703. Assume that the firmware update module 801 transmits an ID and a password set in the image forming apparatus 500 in advance as the authentication information at this time. Upon receiving the authentication information, in step S3.3, the authentication module 703 performs the authentication processing. The authentication module 703 is assumed to carry out the simple authentication using the ID and the password in the first exemplary embodiment for the sake of simplicity of the description, but, needless to say, may use an authentication method other than that.

If the authentication is successful, in step S3.4, the firmware update module 801 issues a subscribing information acquisition request to the tenant management module 702. Assume that the subscribing information acquisition request also contains information of the customer ID received in step S3.1. Upon receiving the subscribing information acquisition request, in step S3.5, the tenant management module 702 specifies the topic that the image forming apparatus 500 is to subscribe to. More specifically, the tenant management module 702 determines that the information of the request transmission topic 1003 contained in the tenant information node corresponding to the specified customer ID among the pieces of tenant information illustrated in FIG. 4 is the topic that the image forming apparatus 500 is to subscribe to.

Upon completing specifying the topic path, in step S3.6, the tenant management module 702 transmits a token acquisition request for the image forming apparatus 500 to subscribe, to the MQTT server module 600. Upon receiving the token acquisition request, in step S3.7, the MQTT server module 600 generates a token, and transmits the generated token to the tenant management module 702. Upon receiving the token, in step S3.8, the tenant management module 702 transmits the information of the topic that the image forming apparatus 500 is to subscribe to and the token required to subscribe, to the firmware update module 801.

Upon receiving the topic information and the token, in step S3.9, the firmware update module 801 calls a subscribing request API of the MQTT communication module 800. When the subscribing request API is called, in step S3.10, the MQTT communication module 800 transmits a subscribing request to the MQTT server module 600. At this time, the MQTT communication module 800 specifies the topic received in step S3.8, and transmits the token together therewith. Upon receiving the subscribing request and the token, in step S3.11, the MQTT server module 600 verifies the received token, and performs the subscribing processing if the verification is succesful.

After the subscribing processing is completed, the latest message as of that time regarding the topic subscribed to may be transmitted to the MQTT communication module 800 due to the retaining function of the MQTT server module 600. Processing at this time is similar to processing in step S6.15 and steps subsequent thereto illustrated in FIG. 8, and therefore a description thereof will be omitted here.

Dynamically switching which component subscribes according to the approval necessary/unnecessary information at the tenant unit 720 in this manner allows the system unit to perform the processing in place of the tenant unit 720 without notifying the tenant unit 720 of an unnecessary message in the case where the approval process is unnecessary.

Figure 7A:
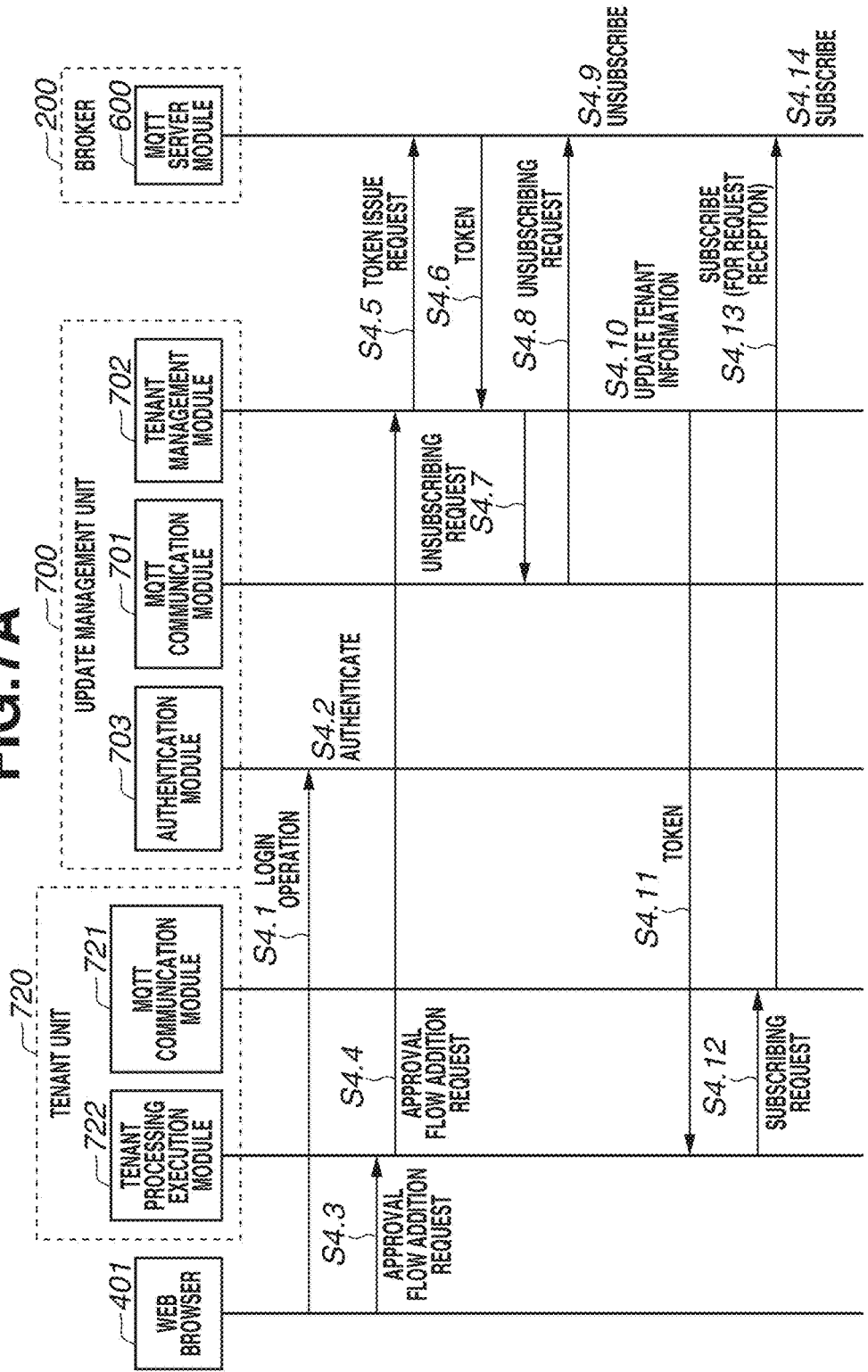

FIGS. 7A and 7B illustrate sequences when the necessity/unnecessity of the approval process is switched in the firmware update at the sales company or the customer company. FIG. 7A illustrates a sequence in a case where the necessity/unnecessity of the approval process is changed from the state in which the approval process is performed by the root system without being performed by the tenant unit 720 to the state in which the approval process is performed by the tenant unit 720.

First, when the person in charge in the sales company, the dealer, or the customer company inputs the authentication information on the web browser 401 on the terminal 400, in step S4.1, the web browser 401 transmits the authentication information to the authentication module 703. In the present example, assume that the web browser 401 transmits the user ID and the password as the authentication information. Upon receiving the user ID and the password from the terminal 400, in step S4.2, the authentication module 703 performs the authentication processing by checking the received user ID and password information.

If the authentication is successful, in step S4.3, the web browser 401 transmits a request to add an approval flow to the tenant processing execution module 722 in response to an operation by the person in charge. Upon receiving the approval flow addition request, in step S4.4, the tenant processing execution module 722 issues an approval flow addition request to the tenant management module 702. Upon receiving the approval flow addition request, in step S4.5, the tenant management module 702 transmits a token issue request for using the MQTT server module 600 to the MQTT server module 600. Upon receiving the token issue request, the MQTT server module 600 issues a token. Then, in step S4.6, the MQTT server module 600 transmits the issued token to the tenant management module 702.

Upon receiving the token, in step S4.7, the tenant management module 702 calls an unsubscribing request API of the MQTT communication module 701. When the unsubscribing request API is called, in step S4.8, the MQTT communication module 701 transmits an unsubscribing request to the MQTT server module 600. Upon receiving the unsubscribing request, in step S4.9, the MQTT server module 600 verifies the token, and performs unsubscribing processing. Upon completion of the unsubscribing processing, in step S4.10, the tenant management module 702 updates the tenant information. More specifically, the tenant management module 702 sets the approval necessary/unnecessary information 1005 illustrated in FIG. 4 to false.

Upon completing the update of the tenant information, in step S4.11, the tenant management module 702 transmits the token received in step S4.6 to the tenant processing execution module 722. Upon receiving the token, in step S4.12, the tenant processing execution module 722 calls the subscribing request API of the MQTT communication module 721. At this time, the tenant processing execution module 722 specifies the request reception topic 1002 contained in the tenant information. In other words, the tenant processing execution module 722 specifies the topic path specifying the parent tenant. When the subscribing request API is called, in step S4.13, the MQTT communication module 721 transmits a subscribing request and the token received in step S4.11 to the MQTT server module 60. Upon receiving the subscribing request and the token, in step S4.14, the MQTT server module 600 verifies the token, and sets the request reception topic 1002 if the verification is successful. After the subscribing processing in step S4.14 is completed, the latest message may be transmitted from the MQTT server module 600 to the MQTT communication module 721 due to the retaining function, but processing at this time is similar to the processing in step S6.4 and the steps subsequent thereto illustrated in FIG. 8 and therefore a description thereof will be omitted here.

FIG. 7B illustrates a sequence in a case where the necessity/unnecessity of the approval process is changed from the state in which the approval process is performed by the tenant unit 720 to the state in which the approval process is performed by the root system without being performed by the tenant unit 720. Processing in steps S5.1 and S5.2 is similar to steps S4.1 and S4.2, and therefore a description thereof will be omitted here.

If the authentication is successful, in step S5.3, the web browser 401 issues a request to delete the approval flow to the tenant processing execution module 722 in response to an operation by the person in charge. Upon receiving the approval flow deletion request, in step S5.4, the tenant processing execution module 722 issues an approval flow deletion request to the tenant management module 702. Upon receiving the approval flow deletion request, in step S5.5, the tenant management module 702 transmits a token issue request for using the MQTT server module 600 to the MQTT server module 600. Upon receiving the token issue request, the MQTT server module 600 issues a token. Then, in step S5.6, the MQTT server module 600 transmits the issued token to the tenant management module 702. Upon receiving the token, in step S5.7, the tenant management module 702 transmits the token to the tenant processing execution module 722.

Upon receiving the token, in step S5.8, the tenant processing execution module 722 calls an unsubscribing request API of the MQTT communication module 721. When the unsubscribing request API is called, in step S5.9, the MQTT communication module 721 transmits an unsubscribing request to the MQTT server module 600. At this time, the MQTT communication module 721 transmits the token received in step S5.7 together therewith. Upon receiving the unsubscribing request and the token, in step S5.10, the MQTT server module 600 verifies the token, and deletes the setting for the request reception if the verification is successful, thereby completing the unsubscribing processing. Upon the completion of the unsubscribing processing, in step S5.11, the tenant processing execution module 722 transmits an unsubscribing completion notification to the tenant management module 702.

Upon receiving the unsubscribing completion notification, in step S5.12, the tenant management module 702 calls the subscribing API of the MQTT communication module 701. At this time, the tenant management module 702 specifies the request reception topic 1002 contained in the tenant information. The topic path of the request reception topic 1002 at this time is the topic path to the parent tenant with respect to the child tenant that has unsubscribed. When the subscribing API is called, in step S5.13, the MQTT communication module 701 transmits a subscribing request to the MQTT server module 600. At this time, the MQTT communication module 701 transmits the token received in step S5.6 together therewith.

Upon receiving the subscribing request and the token, in step S5.14, the MQTT server module 600 verifies the token, and performs the subscribing processing if the verification is successful. Upon completion of the subscribing processing, in step S5.15, the tenant management module 702 updates the tenant information. More specifically, the tenant management module 702 overwrites the approval necessary/ unnecessary information 1005 in the tenant information with false. After the subscribing processing in step S5.14 is completed, the latest message may be transmitted from the MQTT server module 600 to the MQTT communication module 701 due to the retaining function, but processing at this time is similar to the processing in step S6.11 and the steps subsequent thereto illustrated in FIG. 8, and therefore a description thereof will be omitted here. The present processing allows the update management unit 700 to dynamically switch which component subscribes in response to the request in this manner, thereby allowing the firmware update system to flexibly change the approval flow.

FIG. 8 illustrates a sequence indicating a flow of processing until the update notification is transmitted to the image forming apparatus 500 when the person in charge in the device manufacturer notifies the update system of firmware update information. This sequence indicates information notification in a case where there are only the tenant units 720 corresponding to the nodes 1000 and 1010 illustrated in FIG. 4 by way of example.

When the person in charge in the device manufacturer inputs the update information of the firmware on the web browser 401 on the terminal 400, in step S6.1, the web browser 401 transmits the firmware update notification to the tenant management module 702. Upon receiving the firmware update notification, in step S6.2, the tenant management module 702 calls a publishing API of the MQTT communication module 701. At this time, the tenant management module 702 specifies the request transmission topic 902 contained in the root node 900. A content of the message to be published is a Uniform Resource Locator (URL) where the update information of the firmware is written. Detailed information such as a version and an updated content of the firmware and a location from which the firmware is available can be acquired by accessing this URL. In the first exemplary embodiment, the firmware update system is configured in such a manner that the URL is transmitted as the message and the detailed information is acquired based on the URL, but may be configured in such a manner that the detailed information is embedded in the message itself. The format of the message is not limited to this example, and can also contain arbitrary information independently of the update of the firmware.

When the publishing request API is called, in step S6.3, the MQTT communication module 701 transmits a publishing request to the MQTT server module 600. Upon receiving the publishing request, the MQTT server module 600 transmits the message (the URL information) to the MQTT communication module 721 of the tenant unit 720 subscribing to the topic. Upon receiving the message (the URL information), in step S6.5, the MQTT communication module 721 notifies the tenant processing execution module 722 of the message (the URL information). Upon being notified of the URL information, in step S6.6, the tenant processing execution module 722 acquires the update information of the firmware from the URL, and generates a firmware update conformation page 1100 accessible from the web browser 401 for the administrator. In the first exemplary embodiment, the tenant processing execution module 722 only generates the web page at this time, but may be configured to transmit an e-mail for notifying the person in charge of the information in real time.

FIG. 10A illustrates one example of the firmware update confirmation page 1100. Version information 1101 indicates the information acquired from the URL received in step S6.5. A region 1102 is presented to display information indicating the content updated in the version 1101 therein. The content of this information can also be acquired by accessing the URL received in step S6.5. A permission button 1103 is a button for issuing an instruction to permit the update by pressing it. A rejection button 1104 is used to close the firmware update confirmation page 1100 without updating the firmware. If the rejection button 1104 is pressed, processing in step S6.7 and steps subsequent thereto are not performed, which means that the tenant unit 720 and the image forming apparatus 500 located below this tenant unit 720 are not notified of the firmware update notification and the firmware is not updated. If the person in charge accesses the firmware update confirmation page 1100 and presses the permission button 1103, in step S6.7, the web browser 401 transmits an update permission notification to the tenant processing execution module 722.

Upon receiving the update permission notification, in step S6.8, the tenant processing execution module 722 deletes the firmware update confirmation page 1100. The tenant processing execution module 722 deletes the page 1100 so that the page 1100 cannot be accessed in the present exemplary embodiment, but may only overwrite the content of the page 1100. Upon completing the deletion of the web page 1100, in step S6.9, the tenant processing execution module 722 calls a publishing request API of the MQTT communication module 721. At this time, the tenant processing execution module 722 specifies the request transmission topic 1003 contained in the tenant information. A main body of the message is assumed to be created by directly specifying the content (the URL information) received in step S6.5, but may be created by adding information to the message or deleting information from the message, besides generating a new message based on the content received in step S6.5 by the tenant unit 720 that has processed the message.

When the publishing API is called, in step S6.10, the MQTT communication module 721 transmits a publishing request to the MQTT server module 600. Upon receiving the publishing request, the MQTT server module 600 transmits the message to the subscriber subscribing to the specified topic. Since the tenant unit 720 corresponding to the node 1010 does not require the approval process, the tenant management module 702 in the root system subscribes in place of the tenant corresponding to the node 1010. Therefore, in step S6.11, the MQTT server module 600 transmits the message to the MQTT communication module 701 included in the update management unit 700.

Upon receiving the message, in step S6.12, the MQTT communication module 701 notifies the tenant management module 702 of the received message. Upon being notified of the message, in step S6.13, the tenant management module 702 calls the publishing API of the MQTT communication module 701 to perform the processing for the tenant corresponding to the node 1010 in place thereof. At this time, the tenant management module 702 specifies the request transmission topic 1003 contained in the tenant information of the node 1010. In the case where the root system performs the processing in place of the tenant, the message processing, i.e., the approval process in this case, becomes unnecessary, and therefore the message is supposed to be published regardless of the content of the message. When the publishing API is called, in step S6.14, the MQTT communication module 701 transmits a publishing request to the MQTT server module 600.

Upon receiving the publishing request, the MQTT server module 600 transmits the message to the subscriber subscribing the specified topic. The present example is assumed to indicate a sequence when there is one image forming apparatus 500 under the management of the customer company corresponding to the node 1010. Therefore, in step S6.15, the MQTT server module 600 transmits the message (the URL information) to the MQTT communication module 800 of the image forming apparatus 500. In a case where there is a plurality of image forming apparatuses 500, each of the image forming apparatuses 500 is supposed to subscribe to the message from the tenant unit 720 according to the flow illustrated in FIG. 6, which means that the MQTT server module 600 transmits the message to the plurality of image forming apparatuses 500.

Upon receiving the message, the MQTT communication module 800 notifies the firmware update module 801 of the message (the URL information). Upon receiving the message, in step S6.17, the firmware update module 801 acquires, from the received URL, a location to which the firmware is downloaded. Then, the firmware update module 801 downloads the firmware and updates the firmware.

In the present example, the approval process is set to be necessary at the sales company, and therefore the tenant unit 720 is notified of the message of the update notification and the processing regarding the approval is performed by the tenant unit 720. However, in a case where the approval process is set to be unperformed at all of the tenant units 720, the message is transmitted to the image forming apparatus 500 according to only the processing performed by the update management unit 700 without the intervention of the tenant unit 720 at all. Conversely, in a case where the approval process is set to be necessary at all of the tenant units 720, the message is transmitted to the image forming apparatus 500 according to the message processing performed by each of the tenant units 720 without the update management unit 700 performing the message processing at all after publishing the message in step S6.3.

Figure 9:
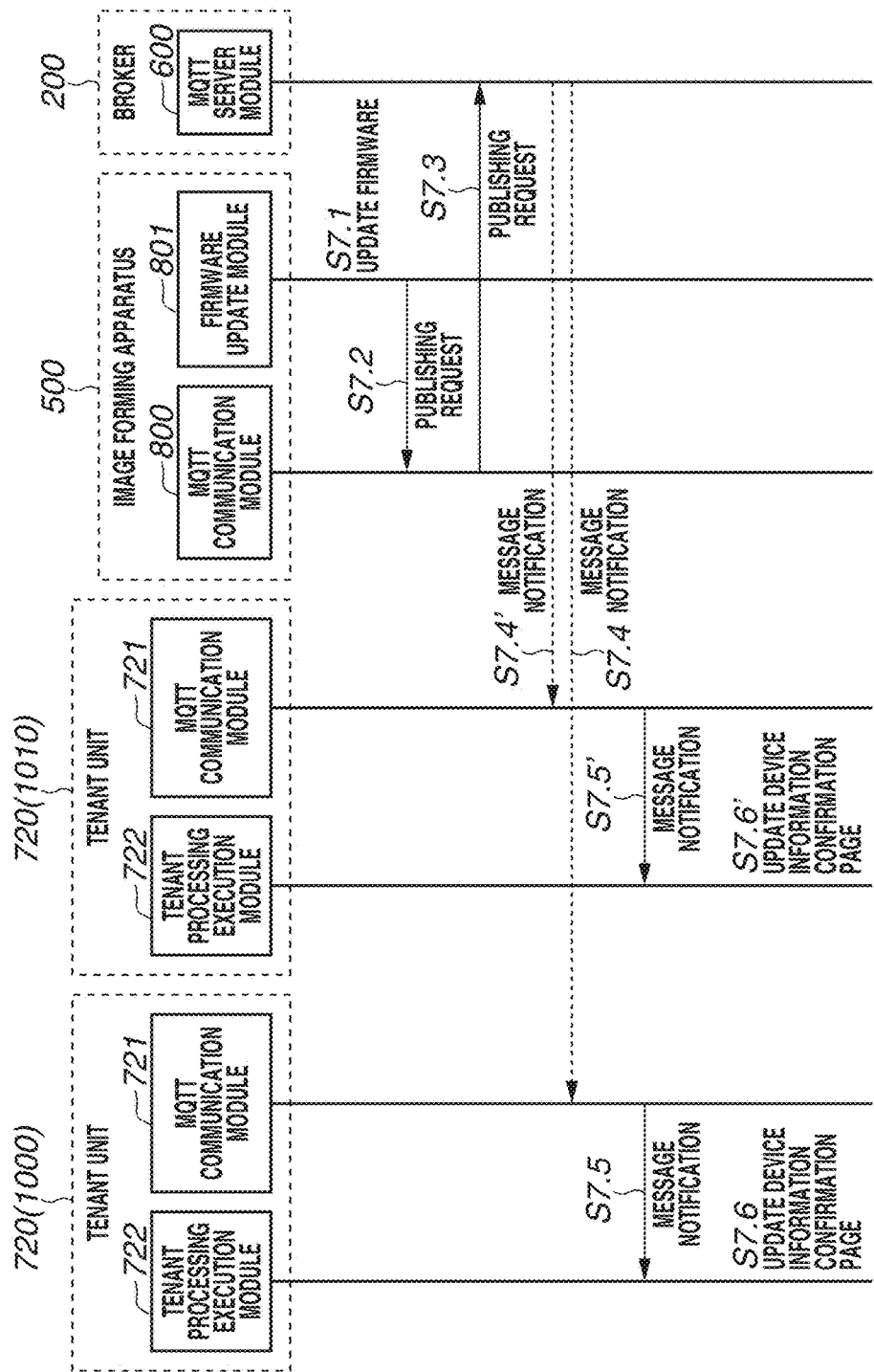
FIG. 9 illustrates a sequence when each tenant unit is notified of a result of a firmware update.

FIG. 9 illustrates a sequence when each of the tenant units 720 is notified of a result of the firmware update. The present sequence will be described referring to an example in which the firmware of the image forming apparatus 500 set up at the customer company "/system/sales1/customer1" is updated in the case where the tenant structure is structured as illustrated in FIG. 4. Then, the present sequence will be described assuming that each of the tenant units 720 corresponding to the nodes 1000 to 1040 subscribes to the response reception topic 1004.

First, in step S7.1, the firmware update module 801 updates the firmware. Upon completing the update of the firmware, in step S7.2, the firmware update module 801 calls a publishing API of the MQTT communication module 800. The firmware update module 801 specifies the topic indicating the hierarchical layer where the image forming apparatus 500 is located as the topic at this time, but the image forming apparatus 500 is not a tenant and therefore is not managed as the tenant information unlike the tenants illustrated in FIG. 4. The image forming apparatus 500 is owned by the customer, which leads to positioning of the image forming apparatus 500 further below the topic path specifying the tenant at the lowest hierarchical layer. Therefore, in this example, the firmware update module 801 specifies "/response/version/system/sales1/customer1/device1".

A content of the message for notifying the tenant unit 720 of the processing result contains an update version, an update date and time, and a processing result code. The update version is the version of the updated firmware, and the update date and time is a date and time when the firmware is updated. The processing result code is a constant number indicating the processing result, and is defined in such a manner that 1 and 0 indicate a success and a failure, respectively. The information returned as the result is not limited to this example, and the firmware update module 801 may be configured to notify the tenant unit 720 of, for example, URL information of a server storing detailed information of the processing result therein.

When the publishing API is called, in step S7.3, the MQTT communication module 800 transmits a publishing request to the MQTT server module 600. Upon receiving the publishing request, in steps S7.4 and S7.4', the MQTT server module 600 transmits the message to the subscriber subscribing to the topic. In the present example, the tenant units 720 corresponding to the nodes 1000 and 1010 match the subscriber subscribing to the topic, so that the MQTT server module 600 transmits the message to the MQTT communication module 721 of each of the tenant units 720 corresponding to the nodes 1000 and 1010. This means that each of the tenant units 720 matches the condition because the wildcard is specified in the topic path following this tenant itself in the response reception topic 1004 set to the broker 200, and therefore the message is transmitted thereto.

Upon receiving the message, in steps 7.5 and S7.5', the MQTT communication module 721 of each of the tenant units 720 notifies the tenant processing execution module 722 of the content of the message. Upon being notified of the message, in steps S7.6 and S7.6', the tenant processing execution module 722 updates information in a device information confirmation page. FIG. 10B illustrates one example of a device information confirmation screen 1200. A device information list display region 1201 is presented to display a list of image forming apparatuses 500 under the management of this tenant therein. A content of the list includes a device name, a version, and a firmware update date and time. The person in charge in each of the companies can recognize when the firmware is updated and what kind of firmware the firmware is updated into by confirming this device information confirmation screen 1200. In the present exemplary embodiment, the tenant processing execution module 722 only displays the result on the web page displayable on the web browser 401, but may perform processing such as notifying the person in charge with use of an e-mail. In this manner, the tenant unit 720 is configured to receive the message regarding the processing result with use of a different topic from the update request, which allows the tenant unit 720 at each of the hierarchical layers to simultaneously receive only the processing result of the relevant image forming apparatus 500 at each of the hierarchical layers.

In the above-described manner, the firmware update system manages the relationship among the sales company, the dealer, and the customer company in association with the hierarchical layer in the topic path. Then, the firmware update system allows the tenant to efficiently transmit the information only to a party related to this tenant itself by subscribing to the topic corresponding to the hierarchical layer one layer above this tenant itself and publishing the information to the topic corresponding to the hierarchical layer of this tenant itself. Further, the firmware update system is configured in such a manner that the structure can be dynamically switched to such a structure that the root system unit performs the processing for transmitting the message in place of the tenant unit 720, thereby allowing the approval process to be further easily added or deleted. Further, the firmware update system defines the topic for the response notification separately from the topic for the processing request, which allows the tenant to receive the processing result regardless of whether the approval process is set to be performed thereby.

OTHER EMBODIMENTS

While the first exemplary embodiment is described above using a use case of firmware distribution as an example, it should be noted that the scope of the present invention is not limited to the application. The present invention can be also applied to various ways of transmitting information according to an instruction issued in a top-down manner, including setting distribution and application distribution.

While the first exemplary embodiment is described above using a multifunction peripheral representative of a device targeted for use in enterprises as an example, the present invention is also applicable to the device even when targeted for use in homes. The application of the present invention is not limited to a printer. The present invention is applicable to any device.

In the above-described exemplary embodiments, an administrator of each company generates the tenant unit 720 in the update management server 300 using the terminal 400, the configuration may be such that the tenant unit 720 is generated in another server different from the update management server 300. Even in such a case, messages can be transmitted and received between the broker 200 and the tenant unit 720 as long as tenant management is performed in the hierarchical structure illustrated in FIG. 4.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-013241, filed Jan. 27, 2017, which is hereby incorporated by reference herein in its entirety.

What is claimed is:

1. An information processing system comprising:
a broker for receiving and distributing messages;
one or more processors; and
one or more memories storing instructions, when executed by the one or more processors, causing the information processing system to function as:
a generation unit configured to generate a message attribute reflecting a hierarchical relationship between a tenant and another tenant according to generation of the tenant in compliance with an instruction to generate the tenant;
a setting unit configured to set, by the broker, the generated message attribute;
a tenant unit configured for the tenant to process a message in response to an approval instruction from the tenant user to distribute the message to a child tenant;
a reception unit configured to receive, by the broker, a message from a specific tenant; and
a transmission unit configured to transmit the received message to the child tenant disposed immediately below the specific tenant based on a message attribute of the child tenant that is set by the setting unit.

2. The information processing system according to claim 1, wherein the reception unit receives a message indicating a processing result from an information processing apparatus that processes a message further transmitted from the child tenant that has received the message, and
wherein the transmission unit transmits the message indicating the processing result to the child tenant based on the message attribute of the child tenant that is set by the setting unit.

3. The information processing system according to claim 2, wherein the setting unit sets two message attributes, namely, a request reception message attribute for receiving a message, and a response reception message attribute for receiving a message regarding a processing result, and
wherein the transmission unit transmits the received message to the child tenant disposed immediately below the specific tenant based on a request reception message attribute of the child tenant, and transmits the message indicating the processing result to the child tenant based on a response reception message attribute of the child tenant.

4. The information processing system according to claim 3, wherein, when the reception unit receives the message indicating the processing result, the transmission unit transmits the message indicating the processing result to the child tenant and a plurality of tenants disposed above the child tenant and including the specific tenant based on the response reception message attribute set by the setting unit.

5. The information processing system according to claim 4, wherein the transmission unit transmits the message indicating the processing result to the child tenant and the plurality of tenants disposed above the child tenant and including the specific tenant based on a plurality of message attributes including a wildcard specified in a path and used for receiving the message indicating the processing result among message attributes that are each the response reception message attribute set by the setting unit.

6. The information processing system according to claim 1, wherein the message attribute set by the setting unit expresses a hierarchical relationship between tenants as a path, and a transmission destination of the message that is indicated by the message attribute is specified in the path.

7. The information processing system according to claim 1, wherein, if processing of the message by a root system in place of the tenant generated in compliance with the generation instruction is specified, the setting unit receives the message attribute from the root system and sets the received message attribute, and wherein the transmission unit transmits the received message to the root system that has requested the setting of the message attribute in place of the child tenant based on the message attribute of the child tenant that is set by the setting unit.

8. The information processing system according to claim 7, wherein, if the processing of the message by the root system in place of the tenant generated in compliance with the generation instruction is specified after the message attribute is set, the setting unit deletes the message attribute already set by the tenant, and receives the message attribute from the root system and sets the received message attribute.

9. A method for controlling an information processing system, the method comprising:
   receiving and distributing messages by a broker;
   generating a message attribute reflecting a hierarchical relationship between a tenant and another tenant according to generation of the tenant in compliance with an instruction to generate the tenant;
   setting, by the broker, the generated message attribute;
   processing, by the tenant, a message in response to an approval instruction from the tenant user to distribute the message to a child tenant;
   receiving, by the broker, a message from a specific tenant; and
   transmitting the received message to the child tenant disposed immediately below the specific tenant based on a message attribute of the child tenant that is set in the setting.

10. A non-transitory computer-readable storage medium storing a program for making a computer execute a method for controlling an information processing system, the method comprising:
   receiving and distributing messages by a broker;
   generating a message attribute reflecting a hierarchical relationship between a tenant and another tenant according to generation of the tenant in compliance with an instruction to generate the tenant;
   setting, by the broker, the generated message attribute;
   processing, by the tenant, a message in response to an approval instruction from the tenant user to distribute the message to a child tenant;
   receiving, by the broker, a message from a specific tenant; and
   transmitting the received message to the child tenant disposed immediately below the specific tenant based on a message attribute of the child tenant that is set in the setting.

* * * * *